United States Patent
Avellan et al.

(10) Patent No.: US 9,300,390 B2
(45) Date of Patent: Mar. 29, 2016

(54) HIGH THROUGHPUT SATELLITE

(71) Applicant: EMC SatCom Technologies, LLC, Miami, FL (US)

(72) Inventors: Abel Avellan, Miami, FL (US); Marcelo Garcia Tunon, Buenos Aires (AR)

(73) Assignee: EMC SatCom Technologies, LLC, Miami, FL (US)

( * ) Notice: Subject to any disclaimer, the term of this patent is extended or adjusted under 35 U.S.C. 154(b) by 171 days.

(21) Appl. No.: 13/956,900

(22) Filed: Aug. 1, 2013

(65) Prior Publication Data
US 2014/0038515 A1    Feb. 6, 2014

Related U.S. Application Data

(60) Provisional application No. 61/678,337, filed on Aug. 1, 2012.

(51) Int. Cl.
*H04B 7/00* (2006.01)
*H04B 7/185* (2006.01)

(52) U.S. Cl.
CPC ........ *H04B 7/18519* (2013.01); *H04B 7/18515* (2013.01); *H04B 7/18517* (2013.01); *H04B 7/18523* (2013.01); *H04B 7/18528* (2013.01)

(58) Field of Classification Search
CPC .................. H04B 7/18515; H04B 7/18528
USPC .............. 455/12.1, 427, 428, 429, 430, 3.02, 455/3.03, 13.3, 67.11; 370/316
See application file for complete search history.

(56) References Cited

U.S. PATENT DOCUMENTS

| 8,238,817 B1 * | 8/2012 | Avellan et al. ............... 455/12.1 |
| 2014/0161025 A1 * | 6/2014 | Chang ........................... 370/316 |

* cited by examiner

*Primary Examiner* — John J Lee
(74) *Attorney, Agent, or Firm* — Blank Rome LLP

(57) ABSTRACT

A high throughput satellite including a transponder configured to receive radio wave signal from a market area, transmit the signal to a hub, receive a response signal from the hub, and transmit both the original signal and the response signal back to the market area. The satellite may also provide increased throughput by re-using spectrum in the Ka band. The satellite may also include a payload architecture which may be reconfigured such that, in response to control signals received from the ground, the payload architecture provides satellite communications to a first market area, a second market area, or both the first market area and the second market area.

20 Claims, 7 Drawing Sheets

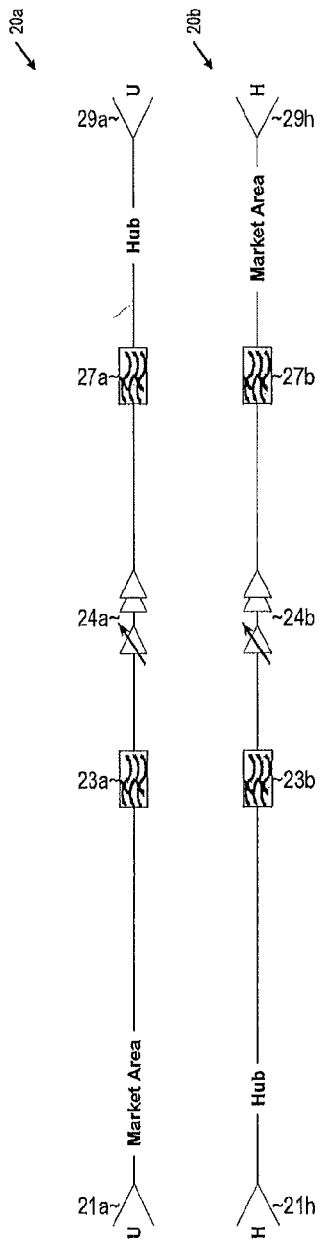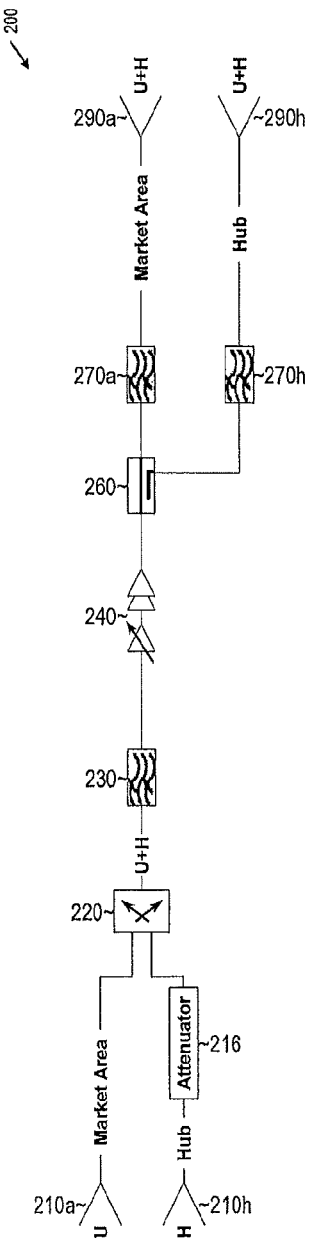
FIG. 2(a) (PRIOR ART)
FIG. 2(b)

(FIG. 1 of *Avellan* - PRIOR ART)

HIGH THROUGHPUT SATELLITE

CROSS-REFERENCE TO RELATED APPLICATIONS

This application claims priority to U.S. Provisional Pat. No. 61/678,337, filed on Aug. 1, 2012, which incorporated herein by reference.

BACKGROUND OF THE INVENTION

1. Field of the Invention

This application relates to a high throughput satellite, specifically a high throughput satellite that provides loop back ability, increased throughput by re-using spectrum and frequencies in the Ka band, and/or a payload architecture which may be re-configured in response to control signals received from the ground.

2. Description of Related Art

Ka band satellites provide significantly more throughput than conventional fixed service satellites over the same orbital spectrum. At the time of its launch over North America, a single Ka band satellite provided more total capacity than all other satellites covering North America combined. As the demand for satellite communications continues to increase, however, there is a need for satellites configured to provide increased throughput.

There is also a need for a Ka band satellite configured to receive a signal from a market area, transmit the signal to a hub, receive a response signal from the hub, and transmit both the original signal from the market area and the response signal from the hub back to the market area.

There is also a need for a satellite which may be re-configured such that, in response to control signals received from the ground, the payload architecture provides satellite communications to a first market area, a second market area, or both the first market area and the second market area.

BRIEF SUMMARY OF THE INVENTION

According to an aspect of an exemplary embodiment, there is provided a Ka band satellite including a transponder configured to receive a signal from a market area, transmit the signal to a hub, receive a response signal from the hub, and transmit both the original signal from the market area and the response signal from the hub back to the market area.

According to an aspect of another exemplary embodiment, there is provided a Ka band satellite which increases the throughput by using the same channel to transmit a signal to a hub which was used by the hub to transmit a signal to the satellite.

According to an aspect of another exemplary embodiment, there is provided a Ka band which may be re-configured such that, in response to control signals received from the ground, the payload architecture provides satellite communications to a first market area, a second market area, or both the first market area and the second market area.

BRIEF DESCRIPTION OF THE SEVERAL VIEWS OF THE DRAWINGS

Aspects of exemplary embodiments may be better understood with reference to the accompanying drawings. The components in the drawings are not necessarily to scale, emphasis instead being placed upon illustrating the principles of exemplary embodiments.

FIG. 2(a) is a schematic diagram illustrating prior art Ka band transponders.

FIG. 2(b) is a schematic diagram illustrating a transponder according to an exemplary embodiment of the present invention.

DETAILED DESCRIPTION OF THE INVENTION

Figure 1:
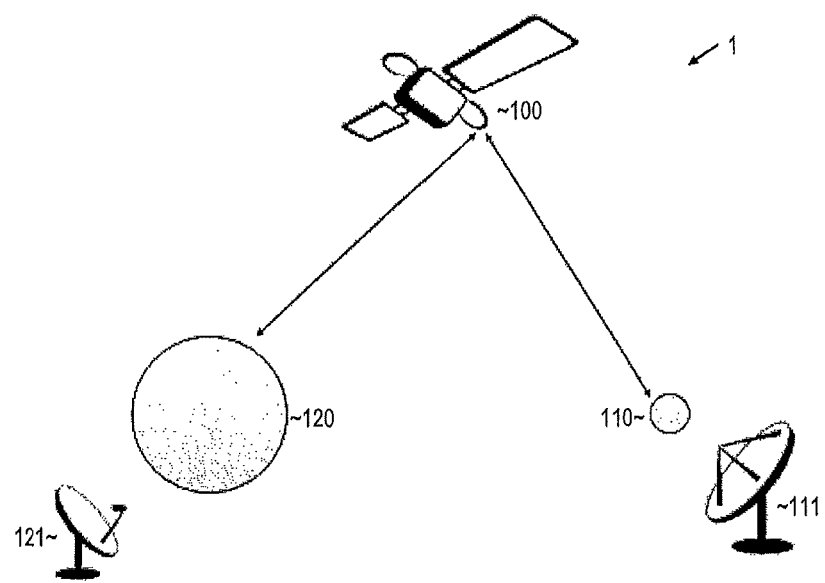
FIG. 1 is an overview illustrating a satellite communications network according to exemplary embodiments of the present invention.

Reference will now be made in detail to exemplary embodiments by way of reference to the accompanying drawings, wherein like reference numerals refer to like parts, components, and structures.

FIG. 1 is an overview illustrating a satellite communications network 1 according to exemplary embodiments of the present invention. The satellite communications network includes a satellite 100, a hub 110, and a market area 120. and The hub 110 may include one or more audio, video and/or data providers (for example, one or more internet service providers, television/video/audio broadcasters, and/or telephone/voice/data services). The hub 110 includes one or more transmitting/receiving antennas 111.

The market area 120 refers to a geographic area which may include a plurality of end users. The market area 120 may include one or more audio, video, and/or data providers. A plurality of transmitting/receiving antennas 121 are located with the market area 120 to communicate with the end users.

The satellite 100 may be any object in orbit configured to transmit and receive radio waves to and from Earth. The satellite 100 may be in geostationary orbit, Molniya orbit, elliptical orbit, or low (polar or non-polar) Earth orbit. The satellite 100 may be, for example, a high throughput satellite that transmits and receives radio waves in the Ka band.

The hub antenna 111 and the plurality of market antennas 121 are configured to transmit and receive radio waves to and from the satellite 100. For example, the hub antenna 111 may be a 13 meter antenna and the market antennas 121 may be 60 or 90 centimeter antennas. The hub antenna 111 and the plurality of market antennas 121 may be configured to transmit radio waves to the satellite 100 in the 29,500-30,000 MHz frequency range and receive radio waves from the satellite 100 in the 19,700-20,200 MHz frequency range.

Each of the hub antenna 111 and the plurality of market area antennas 121 can be connected to a controller (having a processor, a storage device such as memory, an input device, and/or a display) that controls the communication of signals over the respective hub antenna 111 or the market area antenna 121. The controller can be remotely located or co-located with the antenna 121 or 111.

Loop Back Transponder

FIG. 2(a) is a schematic diagram illustrating prior art Ka band transponders 20a and 20b. Each of the prior art Ka band transponders 20a and 20b include a receiving antenna 21a, 21h, a filter 23a, 23b, a transponder/amplifier 24a, 24b, a filter 27a, 27b, and a transmitting antenna 28a, 27h. As illustrated in FIG. 2(a), in order to provide two-way communication between the market area 120 and the hub 110, prior art Ka band satellites require two separate transponders: the transponder 20a configured to receive a signal U from the market area 120 through the market area receiving antenna 21a, perform signal processing and conditioning through filter 23a, transponder/amplifier 24a, and filter 27a, and transmit the signal U to the hub 110 through the hub transmitting antenna 29h; and the transponder 20b configured to receive a signal H from a hub 110 through the hub receiving antenna 21h, perform signal processing and conditioning through filter 23b, transponder/amplifier 24b, and filter 27b, and transmit the signal H to the market area 120 through the market area transmitting antenna 29a.

FIG. 2(b) is a schematic diagram illustrating a transponder 200 according to an exemplary embodiment of the present invention. The transponder 200 includes a market area receiving antenna 210a configured to receive the signal U from the market area 120, a hub receiving antenna 210h configured to receive the signal H from the hub 110, an attenuator 216, a combiner 220, a filter 230, a transponder/amplifier 240, a coupler 260, filters 270a and 270h, and transmitting antennas 290a and 290h configured to transmit radio waves to the hub 110 and market area 120, respectively. The market area receiving antenna 210a and the hub receiving antenna 210h each include a low noise amplifier.

The hub receiving antenna 210h is electrically connected to the attenuator 216. The attenuator 216 is configured to reduce the power of the radio waves received by the hub receiving antenna 210h, including the signal H and any natural noise generated by the hub receiving antenna 210h and its low noise amplifier. In order to compensate for the reduction in power caused by the attenuator 216, the power of the signal H transmitted by the hub transmitting antenna 121 is increased by an amount substantially equal to the amount of attenuation by the attenuator 216. By increasing the power of the signal H transmitted by the hub transmitting antenna 121, in combination with the attenuation of the signal H and the noise, the power level of the signal H remains constant while the amount of noise is reduced by the value of the attenuator.

The market area receiving antenna 210a and the attenuator 216 are electrically connected to the combiner 220. The combiner 220 is configured to receive a plurality of input signals and output a combined output signal. For example, the combiner 220 may be a 2:1 combiner configured to receive signals from the receiving antennas 210a and 210h and output a combined output signal to the filter 230. The combiner 220, however, can combine any number of signals more than two. Here, the combiner 220 combines the signal received by receiving antenna 210a from the market area 120 with the signal received by receiving antenna 210h from the hub 110 to provide a combined signal U+H.

The filter 230 is configured to filter the combined signal 230. The transponder/amplifier 240 is configured to amplify and frequency convert the signal U+H. The transponder/amplifier 240 may include, for example, a traveling wave tube amplifier (TWTA), a down converter (for example, to convert the signal U+H from an uplink frequency to a downlink frequency), etc. The transponder/amplifier 240 outputs the signal U+H to the coupler 260.

The coupler 260 is configured to receive a combined input signal and output a plurality of output signals. For example, the coupler 260 may be a 1:2 coupler which receives the combined input signal U+H from the transponder/amplifier 240 and couples the combined signal U+H (through the filters 270a and 270h, respectively) to both the market area transmitting antenna 290a and the hub transmitting antenna 290h. The coupler 260 may allocate up to 95 percent or more of the power density of the signal U+H to the market area transmitting antenna 290a while 5 percent or less of the power density of the signal U+H may be allocated to the hub transmitting antenna 290h.

Figure 3:
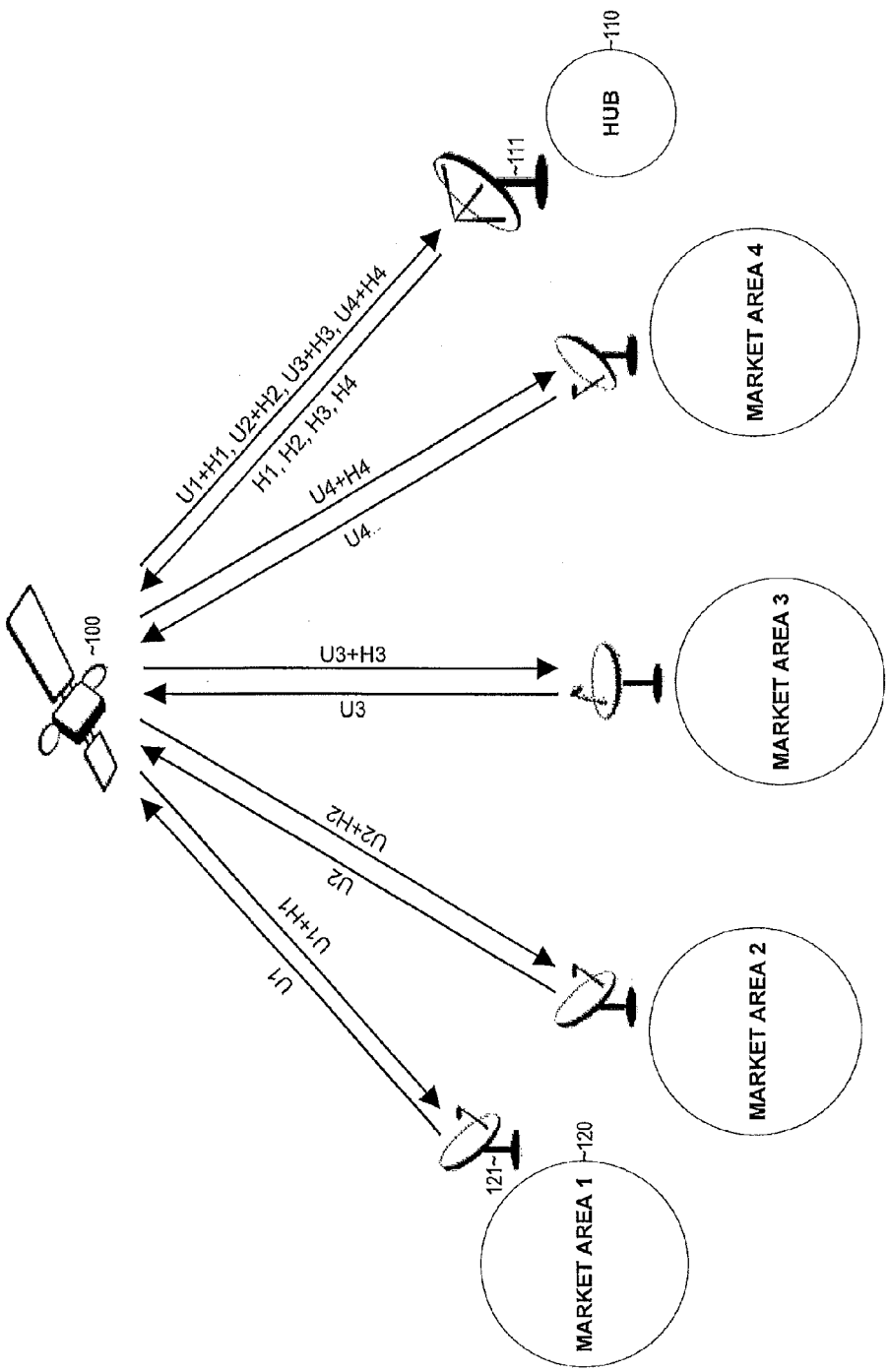
FIG. 3 is an overview illustrating the satellite communications network of FIG. 1 according to another exemplary embodiment of the present invention.

FIG. 3 is an overview illustrating the satellite communications network 1 according to another exemplary embodiment of the present invention.

Referring to FIG. 3, the satellite communications network 1 includes a satellite 100, at least one hub 110 and a plurality of market areas 120. The satellite 100 includes a plurality of transponders, such as the transponder 200 illustrated in FIG. 2(b). In the example illustrated in FIG. 3, the satellite communications network 1 includes one hub 110 and four market areas 120. The hub 110 includes at least one hub transmitting/receiving antenna 111 and each market area 120 includes a plurality of market area transmitting/receiving antennas 121. The satellite 100 is configured to provide two-way communication between each of the market areas 120 and the hub 110 through the transponders 200.

For example, the market area 1 transmits an uplink signal U1 to the satellite 100 and the satellite 100 re-transmits the signal U1 as a downlink signal to the hub 110. In response to the downlink signal U1, the hub transmits an uplink signal H1 to the satellite 100 and the satellite 100 re-transmits the signal H1 to the market area 120.

More specifically, one of the plurality of market area transmitting/receiving antennas 121 of the market area 120 transmits an uplink signal U1 to the satellite 100. The uplink signal U1 is received by the market area receiving antenna 210a of the transponder 200 (illustrated in FIG. 2(a)) of the satellite 100, combined by the combiner 220, filtered by the filter 230, amplified and frequency converted by the transponder/amplifier 240, divided by the coupler 260, filtered by the filter 270h, and transmitted as a downlink signal U1 by the hub transmitting antenna 270h to the hub 110 where it is received by the hub transmitting/receiving antenna 111. In response, the hub transmitting/receiving antenna 111 of the hub 110 transmits an uplink signal H1 to the satellite 100. The uplink signal H1 is received by the hub receiving antenna 210h of the transponder 200, combined by the combiner 220, filtered by the filter 230, amplified and frequency converted by the transponder/amplifier 240, divided by the coupler 260, filtered by the filter 270a, and transmitted as a downlink signal H1 by the market area transmitting antenna 290a to the market area transmitting/receiving antennas 121 of the market area 120.

According to an exemplary embodiment of the present invention, in addition to transmitting the downlink signal H1 to market area 1, the satellite 100 is also configured to transmit the signal U1 generated in the market area 1 back to the plurality of market antennas 121 of the market area 1. This enables a market antenna 121 located in the market area 1 to transmit a signal to all market antennas 121 within the market area 1 without requiring the signal U1 to be transmitted to, processed by, and re-transmitted from the hub 110. For example, if one of the plurality of market antennas 121 located within market area 1 is a television broadcast antenna, the television broadcast may be transmitted to the plurality of market antennas 121 located within market area 1. Referring back to FIG. 2(b), the transponder 200 enables a signal U to be transmitted back to the market area by combining the signal U from the market area 120 with the signal H from the hub 110 and simultaneously transmitting the combined signal U+H to both the market area 120 and the hub 110. As described above, the signals U and H are combined by the combiner 220 and distributed to both the market area 120 and the hub 110 by the coupler 260.

Frequency Re-Use

Figure 4A:
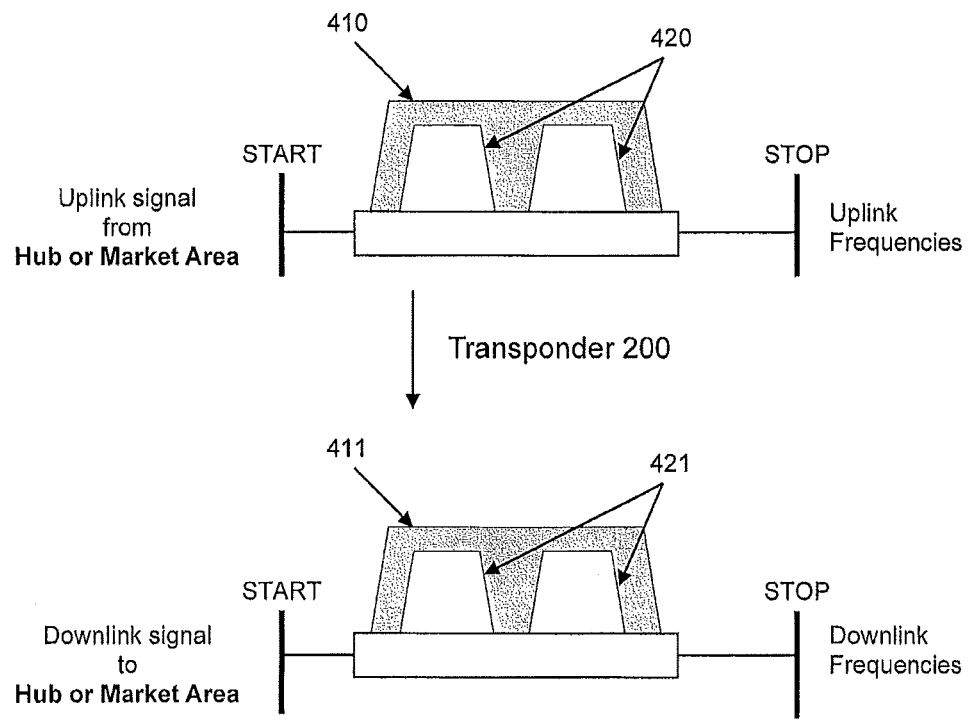
FIG. 4(a) is a diagram illustrating the bandwidth usage of the transponder 200 according to exemplary embodiment of the present invention.

The transponder 200 also increases throughput by re-using spectrum in the Ka band. FIG. 4(a) is a diagram illustrating the bandwidth usage of the transponder 200 according to exemplary embodiment of the present invention. Referring to FIG. 4(a), the uplink signal from the hub 110 is transmitted by carrier wave 410 while the uplink signal from the market area 120 is transmitted by carrier wave 420.

The carrier wave 410 from the hub 110 and the carrier wave 420 from the market area 120 are allocated on the same frequency segment (within the Ka band uplink frequencies) while the carrier wave 411 to the hub 110 and the carrier wave 421 to the market area 120 are allocated to the same frequency segment (within the Ka band downlink frequencies). Using the same frequency segment for both the carrier wave 410 from the hub 110 and the carrier wave 420 from the market area 120 (and using the same frequency segment for both the carrier wave 411 to the hub 110 and the carrier wave 421 to the market area 120) increases the total available bandwidth on the transponder 200. Re-using the frequencies of the transponder 200 allows additional frequencies to be used which would otherwise be unavailable. Therefore, the throughput of the satellite 100 is increased.

In a prior are satellite communications system, because the uplink signal from the hub 110 can be several orders of magnitude larger than the downlink signal to the hub 110, the uplink signal from the hub can swamp the downlink signal to the hub. In order to overcome this problem, the satellite 100 according to an exemplary embodiment of the present invention may be used in conjunction with a hub 110 which is enabled with a Noise Reduction System (NRS). The NRS of hub 110 may be, for example, the NRS described in U.S. Pat. No. 8,238,817 B1 to Avellan, et al., which is incorporated herein by reference.

Figure 4B:
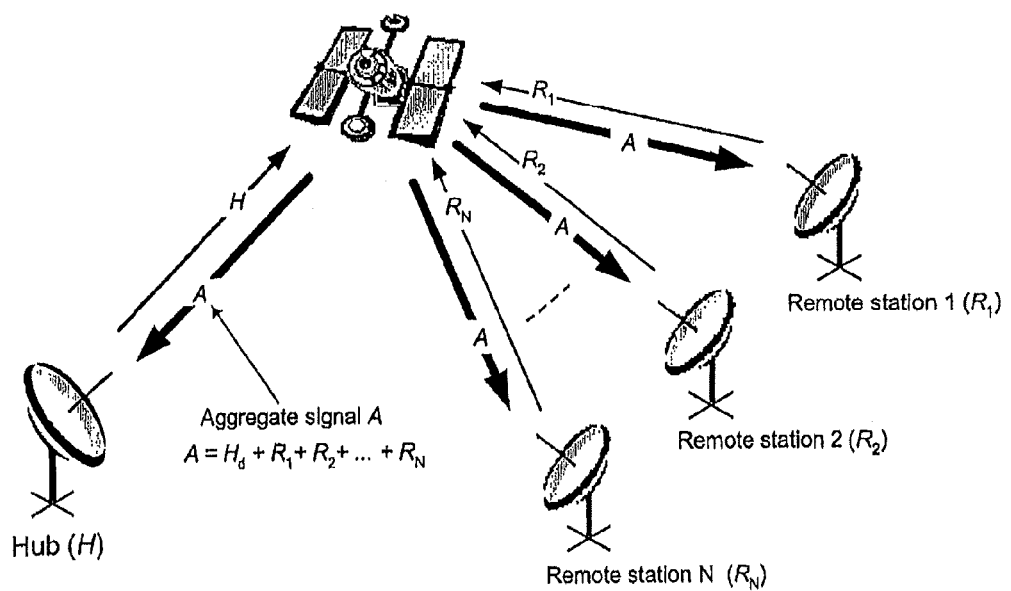
FIG. 4(b) is an overview of a prior art Noise Reduction System (NRS).

Referring to FIG. 4(b), a hub 110 which is enabled with the NRS described in Avellan transmits a signal H and receives an aggregate signal A from a plurality of remote stations (which are analogous to the market areas 120 of the present application). In addition to the signals $R_1$ through $R_N$ from the plurality of remote stations, the aggregate signal A includes a signal $H_d$, which is a replica of the original signal H from the hub 110 after it has suffered delays in time, shifts in frequency, changes in amplitude, and other distortions as it travels to and from the satellite. The NRS described in Avellan processes the aggregate signal A and removes the replica signal $H_d$ from the aggregate signal A. Removing the replica signal $H_d$ from the aggregate signal A enables the hub 110 to transmit and receive signals to and from a market area over the same frequency range without the uplink signal swamping the downlink signal. The satellite 100 of the present invention takes advantage of this ability and transmits a signal from a market area 120 to the hub 110 over the same frequency range as the hub 110 uses to transmit a signal to the market area 120.

Switchable Transponders

Referring back to FIGS. 1 and 2, the satellite 100 provides satellite communication to a plurality of market areas 120. In some instances, the demand from a market area 120 for satellite communications is such that a single transponder 200 is configured to provide satellite communications between that single market area 120 and the hub 110. In other instances, a single transponder 200 may provide satellite communications for multiple market areas 120 (through multiple ground station receiving antennas 210 and multiple ground station transmitting antennas 290). After a satellite is in orbit, however, the demand for satellite communications in each of the market areas 120 may change. After a satellite is in orbit, there is no way to adjust the configuration of the transponders 20a and 20b from the ground in response to the changing market conditions in the market areas 120. Therefore, there is a need for transponders which may be re-configured from the ground in response to changing market conditions.

Figure 5:
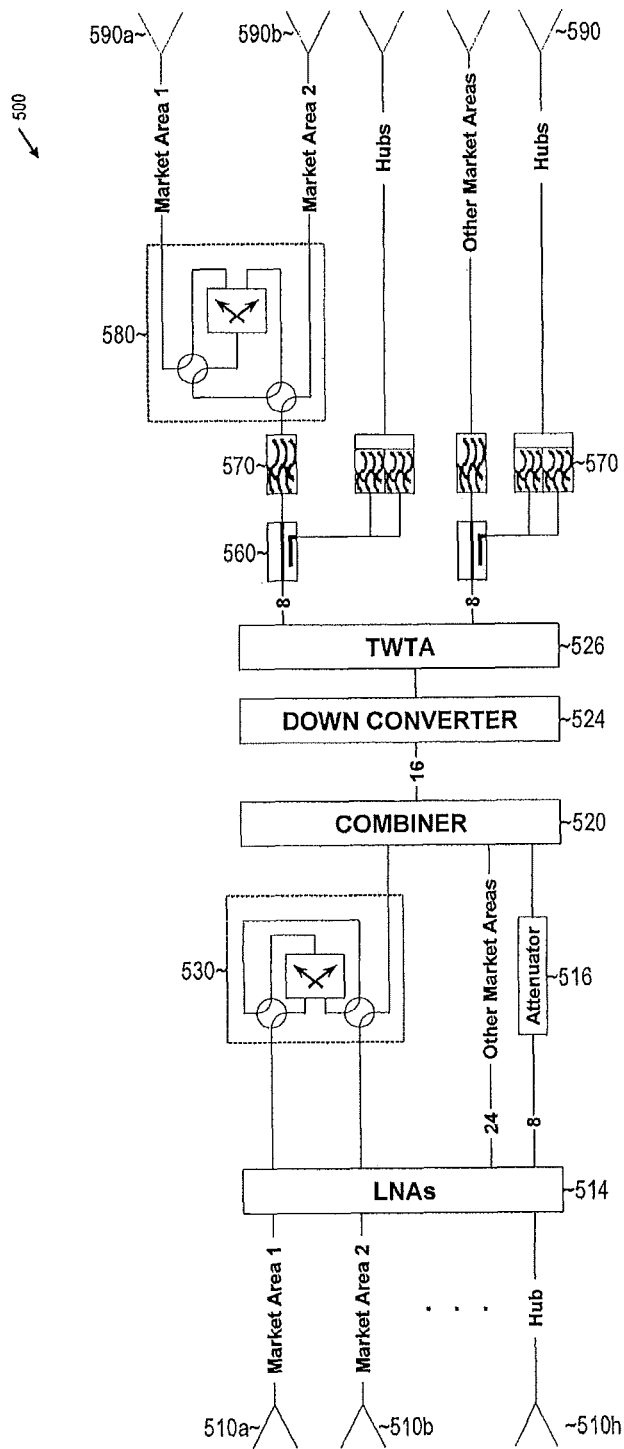
FIG. 5 is a schematic diagram illustrating a payload architecture of the satellite of FIG. 1 according to an exemplary embodiment of the present invention.

FIG. 5 is a schematic diagram illustrating a payload architecture 500 of the satellite 100 according to an exemplary embodiment of the present invention. As will be described in more detail below, the payload architecture 500 includes at least one switchable transponder which may be re-configured from the ground while the satellite 100 is in orbit in order to respond to changing market conditions.

Similar to the transponder 200 illustrated in FIG. 2(b), the payload architecture 500 includes ground station receiving antennas 510, an attenuator 516, a combiner, 520, couplers 560, filters 570, and a plurality of ground station transmitting antennas 590. The ground station receiving antennas 510 may include a market area receiving antenna 510a configured to receive signals from the market area 1, a market area receiving antenna 510b configured to receive signals from the market area 2, a hub receiving antenna 510h configured to receive signals from a hub 110, and additional receiving antennas (not pictured) configured to receive signals from additional market areas 120. The ground station transmitting antennas 590 may include a market area transmitting antenna 590a configured to transmit signals to the market area 1, a market area transmitting antenna 590b configured to transmit signals to the market area 2, a hub transmitting antenna 590h configured to transmit signals to a hub 110, and additional transmitting antennas (not pictured) configured to transmit signals from additional market areas 120.

The payload architecture 500 also includes low noise amplifiers (LNAs) 514, a down converter 524, and a traveling wave tube amplifier (TWTA) 526. These features may also be included in the transponder 200 illustrated in FIG. 2(b).

The low noise amplifiers 514 are configured to amplify the signals received by the receiving antennas 510 and compensate for the loss in power which occurs from the ground transmission antenna to a receiving antenna 510.

The attenuator 516 is configured to reduce the power of the radio waves received by the hub receiving antenna 510h, including the signal H and any natural noise generated by the hub receiving antenna 510h and the LNA 514. Similar to the attenuator 216 illustrated in FIG. 2(b), in order to compensate for the reduction in power caused by the attenuator 516, the power of the signal H transmitted by the hub transmitting antenna 121 is increased by an amount substantially equal to the amount of attenuation by the attenuator 516. By increasing the power of the signal H transmitted by the hub transmitting antenna 121, in combination with the attenuation of the signal H and the noise, the power level of the signal H remains constant while the amount of noise is reduced by the value of the attenuator.

The combiner 520 is configured to combine signals received by the receiving antennas 510. Similar to the combiner 220 illustrated in FIG. 2(b), the combiner 520 may combine a signal U received from a market area 120 with a signal H received from a hub 110.

The down converter 524 is configured to convert the frequency of a signal from an uplink frequency (i.e., the frequency of a signal received by a receiving antenna 510) to a downlink frequency (i.e., the frequency at which the signal will be transmitted by a transmitting antenna 590). For example, the down converter 524 may convert an uplink signal in the 29,500-30,000 MHz range to a downlink signal in the 19,700-20,200 MHz range. The traveling wave tube amplifier 526 is configured to amplify radio waves.

The coupler 560 is configured to receive a combined input signal and output a plurality of output signals. Similar to the coupler 260 illustrated in FIG. 2(b), the coupler 560 may be a 1:2 coupler which receives the combined input signal U+H from the transponder/amplifier 240 and couples the combined signal U+H (through the filters 570) to both the hub transmitting antenna 290h and either a market area transmitting antenna 290 or the switching element 580.

The payload architecture 500 also includes switching elements 530 and 580. As will be explained in detail with reference to FIGS. 6(a) through 6(e), the switching elements 530 and 580 enable the satellite 100 to provide satellite communication to market area 1, market area 2, or both market area 1 and market area 2.

FIGS. 6(a) through 6(e) are schematic diagrams illustrating the operation of the switching elements 530 and 580 (sometimes called "baseball switches") of the payload architecture 500 according to an exemplary embodiment of the present invention. As illustrated by the thickened lines in FIGS. 6(a), 6(d), and 6(e), the switching elements 530 and 580 enable the payload architecture 500 to connect the receiving antenna for market area 2 (through intervening elements) with the transmitting antenna from market area 2 (FIG. 6(a)), or to connect the receiving antenna for market area 1 (through intervening elements) with the transmitting antenna from market area 1 (FIG. 6(d)) and connect the receiving antenna for market area 2 (through intervening elements) with the transmitting antenna from market area 2 (FIG. 6(e)).

Figure 6:
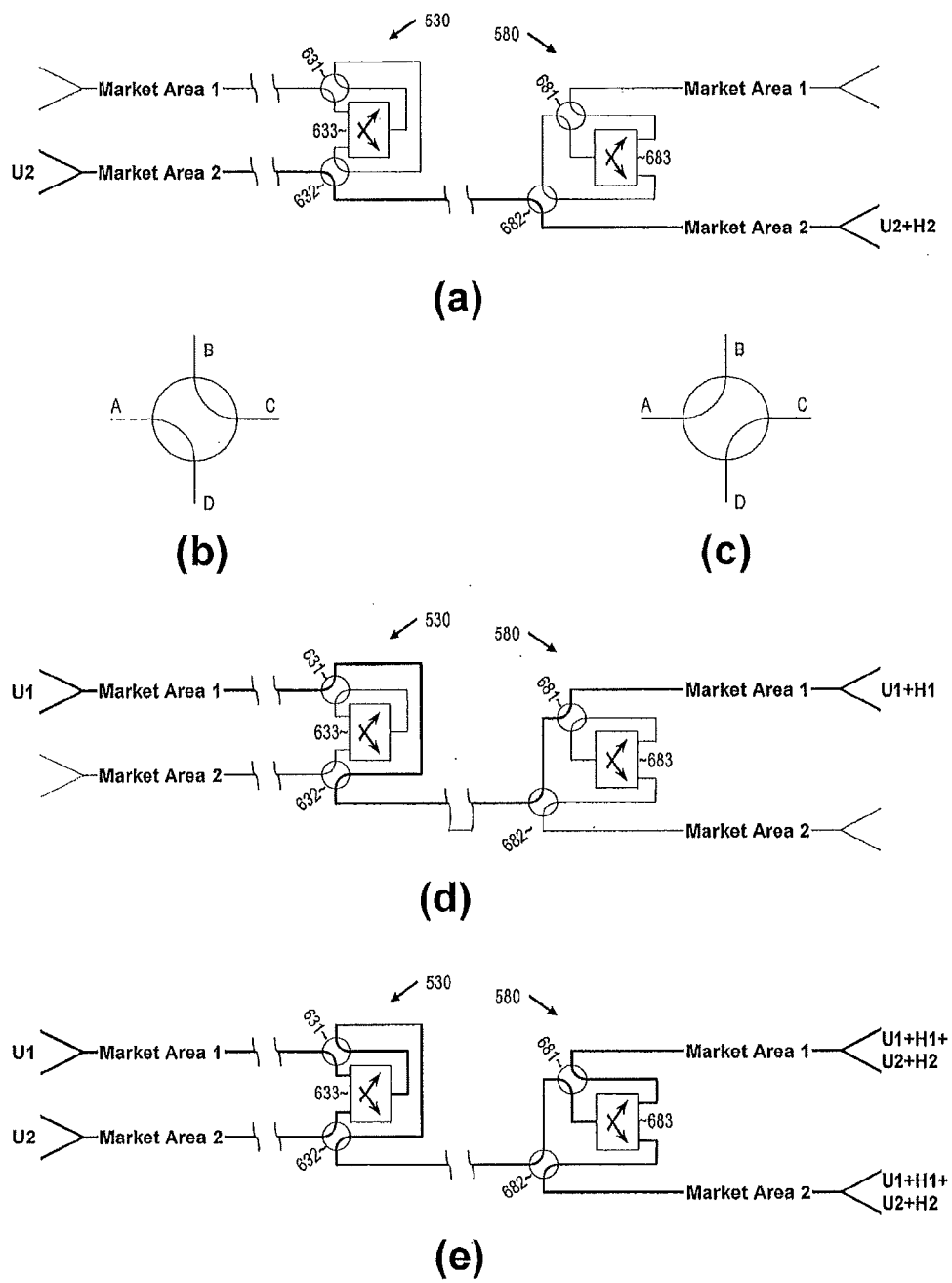
FIGS. 6(a) through 6(e) are schematic diagrams illustrating the operation of switching elements of the payload architecture of FIG. 5 according to an exemplary embodiment of the present invention.

For each of these embodiments of FIG. 6, it should be appreciated that the combiner 520 combines the signal U from the market area 120 with the signal H from the hub 110 and transmits a combined output signal U+H to both the hub 110 and the market area 120 (as illustrated in FIGS. 5 and 2(b)).

Referring to FIG. 6(a), the switching element 530 includes a switch 631, a switch 632, and a combiner 633 and the switching element 580 includes a switch 681, a switch 682, and a divider 683. The combiner 633, which is similar to the combiner 220 described above with reference to FIG. 2(a), is configured to combine two input signals and output a combined output signal. In the example illustrated in FIGS. 6(a) through 6(e), the combiner 633 is a 2:1 combiner. The divider 683 is configured to divide one input signal and output two divided output signals. In the example illustrated in FIGS. 6(a) through 6(e), the divider 683 is a 2:1 divider.

In the example illustrated by the thickened line in FIG. 6(a), the switch 632 of the switching element 530 is configured to connect the receiving antenna of the market area 2 (through intervening elements) to the switching element 580 and the switch 682 of the switching element 580 is configured to output a signal through the transmitting antenna for market area 2. In other words, as configured in FIGS. 5 and 6(a), the payload architecture 500 is configured to receive the signal U2 from market area 2 and transmit the corresponding response signal H2 from the hub 110 (along with the signal U2) to the market area 2.

FIGS. 6(b) and 6(c) illustrate the operation of the switches 631, 632, 681, and 682. In one configuration, as illustrated in FIG. 6(b), terminal A is in electrical communication with terminal D and terminal B is in electrical communication with terminal C. In another configuration, as illustrated in FIG. 6(c), terminal A is in electrical communication with terminal B and terminal C is in electrical communication with terminal D.

The switches 631 and 681 may operate in tandem. In other words, both the switch 631 and the switch 681 are configured either as illustrated in FIG. 6(b) or as illustrated in FIG. 6(c). The switches 632 and 682 similarly may operate in tandem. Both switching elements 530 and 580 are re-configured in response to control signals received from ground, enabling the payload architecture 500 of the satellite 100 to be re-configured even after it is in orbit.

In the example illustrated by the thickened line in FIG. 6(d), the switches 631 and 632 of the switching element 530 are configured to connect the receiving antenna of the market area 1 (through intervening elements) to the switching element 580 and the switches 682 and 681 of the switching element 580 are configured to output a signal through the transmitting antenna for market area 1. Accordingly, as configured in FIG. 6(d), the payload architecture 500 is configured to receive the signal U1 from market area 1 and transmits the corresponding response signal H1 from the hub 110 (along with the signal U1) to the market area 1.

In the example illustrated by the thickened line in FIG. 6(e), the switch 631 of the switching element 530 is configured to connect the receiving antenna of the market area 1 (through intervening elements) to an input of the combiner 633 of the switching element 530 and the switch 632 of the switching element 530 is configured to connect the receiving antenna of the market area 2 (through intervening elements) to another input of the combiner 633. The combiner 633 outputs a combined signal U1+U2. In this configuration, the switches 631 and 632 are also configured to connect the output of the combiner 633 with the switching element 580. The switches 682 and 681 of the switching element 580 are configured to output the combined output signal of the payload architecture 500 to the divider 683 of the switching element 580. The divider 683 outputs two output signals, one the two output signals is connected through the switch 681 of the switching element 580 to the transmitting antenna for market area 1 and the other output signal is connected through the switch 682 of the switching element 580 to the transmitting antenna for market area two. Accordingly, as configured in FIG. 6(d), the payload architecture 500 is configured to receive the signal U1 from market area 1 and transmits the corresponding response signal H1 from the hub 110 (along with the signals U1, U2, and H2) to the market area 1. The payload architecture 500 is also configured to receive the signal U2 from market area 2 and transmit the corresponding response signal H2 (along with the signals U2, U1 and H1) to the market area 2.

Therefore, the payload architecture 500 of the satellite 100 is configured to provide satellite communications to market area 1, market area 2, or both market areas 1 and 2. As described above, the switching elements 530 and 580 enable the payload architecture 500 to be re-configured in response to control signals from the ground such that the coverage areas of the payload architecture 500 may be adjusted in response to changes to changes in market conditions.

Each of the exemplary embodiments described above may be realized separately or in combination with other exemplary embodiments. For example, the satellite 100 of FIG. 1 may include the loop back transponder 200 described with reference to FIGS. 2-3, the frequency re-use described with reference to FIG. 4, and/or the switchable transponder described with reference to FIGS. 5-6.

The foregoing description and drawings should be considered as illustrative only of the principles of the inventive concept. Exemplary embodiments may be realized in a variety of manners and are not intended to be limited by the preferred embodiments described above. Numerous applications of exemplary embodiments will readily occur to those skilled in the art. Therefore, it is not desired to limit the inventive concept to the specific examples disclosed or the exact construction and operation shown and described. Rather, all suitable modifications and equivalents may be resorted to, falling within the scope of this application.

The invention claimed is:

1. A satellite transponder, comprising:
a market area ground station receiving antenna configured to receive a first signal from a market area;
a hub ground station receiving antenna configured to receive a second signal from a hub;
a combiner configured to combine the first signal and the second signal into a combined input signal;
a coupler configured to output a combined output signal;
a market area ground station transmitting antenna configured to transmit the combined output signal to the market area; and
a hub ground station transmitting antenna configured to transmit the combined output signal to the hub.

2. The satellite transponder of claim 1, wherein:
the first signal comprises first information;
the second signal comprises second information, and
the combined output signal comprises the first information and the second information.

3. The satellite transponder of claim 1, wherein the second signal received from the hub is transmitted by the hub in response to the first signal.

4. The satellite transponder of claim 1, wherein the market area ground station transmitting antenna and the hub ground station transmitting antenna are configured to transmit the combined output signal in the Ka band.

5. The satellite transponder of claim 1, wherein:
the market area ground station receiving antenna is configured to receive the first signal from a market area over a first Ka band frequency range,
the hub ground station receiving antenna is configured to receive the second signal from a hub over a second Ka band frequency range, and
the second Ka band frequency range at least partially overlaps the first Ka band frequency range.

6. The satellite transponder of claim 5, wherein:
the market area ground station transmitting antenna is configured to transmit the combined output signal to the market area over a third Ka band frequency range,
the hub ground station transmitting antenna is configured to transmit the combined output signal to the hub over a fourth Ka band frequency range, and
the third Ka band frequency range at least partially overlaps the fourth Ka band frequency range.

7. The satellite transponder of claim 1, further comprising:
a second market area ground station receiving antenna configured to receive radio waves transmitted from a second market area; and
a second market area ground station transmitting antenna configured to transmit radio waves to the second market area,
wherein, in response to a control signal, the satellite is configured to provide two-way satellite communication between:
the market area and the hub,
the second market area and the hub, or
the market area and the hub and the second market area and the hub.

8. A satellite, comprising:
a hub ground station receiving antenna configured to receive a first signal from a hub over a first Ka band frequency range, and
a market area ground station receiving antenna configured to receive a second signal from a market area over a second Ka and frequency range,
wherein the first Ka band frequency range at least partially overlaps the second Ka band frequency range.

9. The satellite transponder of claim 8, wherein each of the first Ka band frequency range and the second Ka band frequency range comprise frequencies reserved for uplink signals.

10. The satellite transponder of claim 8, further comprising:
a hub ground station transmitting antenna configured to transmit a third signal to the hub over a third Ka band frequency range; and
a market area ground station transmitting antenna configured to transmit a fourth signal to a market area over a fourth Ka band frequency range,
wherein the third Ka band frequency range at least partially overlaps the fourth Ka band frequency range.

11. The satellite transponder of claim 10, wherein each of the third Ka band frequency range and the fourth Ka band frequency range comprise frequencies reserved for downlink signals.

12. The satellite transponder of claim 10, wherein:
the first signal comprises first information;
the second signal comprises second information, and
the third signal comprises the first information and the second information.

13. The satellite transponder of claim 10, wherein:
the first signal comprises first information;
the second signal comprises second information, and
the fourth signal comprises the first information and the second information.

14. The satellite transponder of claim 10, further comprising:
a second market area ground station receiving antenna configured to receive radio waves transmitted from a second market area; and
a second market area ground station transmitting antenna configured to transmit radio waves to the second market area,
wherein, in response to a control signal, the satellite is configured to provide two-way satellite communication between:
the market area and the hub,
the second market area and the hub, or
the market area and the hub and the second market area and the hub.

15. A satellite transponder, comprising:
a first market area ground station receiving antenna configured to receive a first signal transmitted from a first market area;
a second market area ground station receiving antenna configured to receive a second signal transmitted from a second market area;
a hub ground station receiving antenna configured to receive a third signal transmitted from a hub;
a first market area ground station transmitting antenna configured to transmit a fourth signal to the first market area;
a second market area ground station transmitting antenna configured to transmit a fifth signal to the second market area; and a hub ground station transmitting antenna configured to transmit a sixth signal to the hub, wherein, in response to a control signal, the satellite is configured to provide two-way satellite communication between:

the first market area and the hub, the second market area and the hub, or the first market area and the hub and the second market area and the hub.

16. The satellite transponder of claim 15, wherein the control signals are received from the ground while the satellite transponder is in orbit.

17. The satellite transponder of claim 15, further comprising:

a first switching element configured to output the first signal, the second signal, or the first signal and the second signal in response to the control signals; and a second switching element configured to output the fourth signal, the fifth signal, or the fourth signal and the fifth signal in response to the control signals.

18. The satellite transponder of claim 15, wherein:

the first signal comprises first information, the third signal comprises second information, and the fourth signal comprises a combined output signal comprising the first information and the second information.

19. The satellite transponder of claim 15, wherein the first market area ground station transmitting antenna, the second market area ground station transmitting antenna, and the hub ground station transmitting antenna are configured to transmit radio waves in the Ka band.

20. The satellite transponder of claim 15, wherein:

the first market area ground station receiving antenna is configured to receive the first signal transmitted from the first market area over a first Ka band frequency range, the hub ground station receiving antenna is configured to receive the third signal transmitted from a hub over a second Ka band frequency range, wherein the second Ka band frequency range at least partially overlaps the first Ka band frequency range.

* * * * *